Dec. 25, 1934.    R. BLAND    1,985,762
AUTOMATIC POWER TRANSMISSION SYNCHRONIZER
Original Filed Aug. 11, 1928    3 Sheets-Sheet 1

INVENTOR
Reginald Bland

Dec. 25, 1934.  R. BLAND  1,985,762
AUTOMATIC POWER TRANSMISSION SYNCHRONIZER
Original Filed Aug. 11, 1928   3 Sheets-Sheet 2

Inventor.
Reginald Bland

Dec. 25, 1934.    R. BLAND    1,985,762
AUTOMATIC POWER TRANSMISSION SYNCHRONIZER
Original Filed Aug. 11, 1928    3 Sheets-Sheet 3

Inventor
Reginald Bland

Patented Dec. 25, 1934

1,985,762

UNITED STATES PATENT OFFICE 1,985,762

AUTOMATIC POWER-TRANSMISSION SYNCHRONIZER

Reginald Bland, Pasadena, Calif.

Application August 11, 1928, Serial No. 298,934
Renewed April 12, 1933

30 Claims. (Cl. 74—472)

The present invention relates to mechanical synchronizers and more particularly to a mechanical synchronizer designed to facilitate re-engagement of disengaged gears or clutches in a power-transmission system.

In a power plant comprising a motor, an engine, a water wheel, or other power unit, and a driven load element, such as a vehicle, a boat, a dynamo, or any sort of machine, it is frequently desirable to disconnect the load element from the power element while in motion, and, while still in motion, to again connect it with the same or another power element. Among the most familiar instances are, shifting gears in an automobile, switching from electric drive to gas engine drive in a submarine boat, and coupling a reserve engine to a dynamo while in motion. In such instances, for safe and smooth engagement of the gears or clutches in the transmission system, it is desirable that the opposing transmission elements which are about to be engaged shall be brought as near as possible to the same linear speed.

The object of my invention is to provide means for synchronizing disconnected transmission elements by automatically regulating the speed of the power unit to correspond with the speed of the freely moving load element, having reference to the ratio of the gears which are about to be engaged, and thus to facilitate safe and smooth re-engagement of the transmission elements. This is accomplished through instrumentalities operated from the power element and other co-acting instrumentalities operated from the load element and other instrumentalities operated by both co-acting instrumentalities, to vary the speed of the power element, these instrumentalities being so constructed and so assembled in their relationships to each other and to the power element, and to the load element, that when the power element at any given time is operating at a speed in excess of the speed of the load element, these instrumentalities will co-act to reduce the speed of the power element, and that when the power element is operating at a speed less than the speed of the load element, the same instrumentalities will co-act to increase the speed of the power element.

To the above ends the present invention includes a power element, a load element, means for varying the speed of the power element, and co-acting mechanisms operated simultaneously from both the power element and the load element and actuating the said speed varying means.

The present invention further includes a prime mover, means to vary the fluid or fuel supply thereto, and means whereby the fluid or fuel supply regulator is operated jointly by a moving part of the prime mover itself and a moving part of the driven load, said means co-acting to vary the fluid or fuel supply inversely as the relation of the speed of the prime mover to the speed of the load element and to maintain the fluid or fuel supply without variation when the speed of the prime mover conforms in a predetermined relation to the speed of the driven load.

The invention further includes means for varying the fluid or fuel supply to a motor, comprising means operated by the motor itself, and means operated by the driven load, and means for automatically reducing the fluid or fuel supply when the motor overruns a predetermined relation to the load, and for automatically increasing the fluid or fuel supply when the motor underruns a predetermined relation to the load, and for automatically maintaining the fluid or fuel supply constant when the motor is runing at a predetermined relation to the speed of the load.

The invention further includes the devices and combinations of devices which will be hereinafter described and named.

A mechanism functioning as I have described, and thus expressing qualitatively the difference in speed of two moving elements, is a differential mechanism, of which there are various types and forms. While I have chosen to illustrate a type of differential using the bevel gear form, it is not necessary to limit the construction of the mechanism for utilizing my invention to that type or form, as I might use a flat pinion form or a planetary gear form, a chain and sprocket type, or a pneumatic differential, or a hydrostatic differential, or an electrical differential, and still fully accomplish my object as set forth herein and within the scope of the present specification and claims. What I believe and claim to be broadly new with me and desire to protect by Letters Patent is the use of a differential mechanism comprising two oppositely acting elements jointly controlling a reciprocally moving element to synchronize disconnected transmission elements between a power element and a load element.

I would further point out that the power element may be any moving part of an electric motor of any sort, or it may be any moving part of any prime mover such as a water wheel, a steam engine of any type, a gas engine of any type, an air engine, a windmill, or it may be a moving part of a spring motor, or of a weight motor, or of any clock work. Furthermore, the load element may be another power element, or it may be any moving shaft or other driving part of an electric generator, of a lathe, of a grindstone, of any power driven machine, of an air propeller, of a water propeller, of a vehicle propeller, or it may be a wheel, or a drum, or a vehicle.

Furthermore, the transmission elements may be of any type, such as friction clutch, jaw clutch or sliding gear, or may be single or variable speed.

One differential driving member, including its driving connections from the power element, coacts with the opposite differential driving member, including its driving connections from the load element, to actuate the floating member of the differential which, as the speed varying means of this combination, controls the speed of the load element by opening or closing the throttle, advancing or retarding the spark, opening or closing a sluice, increasing or diminishing electrical resistance as by a rheostat, increasing or diminishing the pitch of vanes as in a wind mill or waterwheel, applying or releasing a brake, or connecting or disconnecting an auxiliary speed source, or lengthening or shortening a pendulum as in a clock work mechanism.

The invention is shown in the accompanying drawings, of which there are three sheets, in which—

The same reference numerals are used to identify the same parts throughout the drawings.

Figure 1:
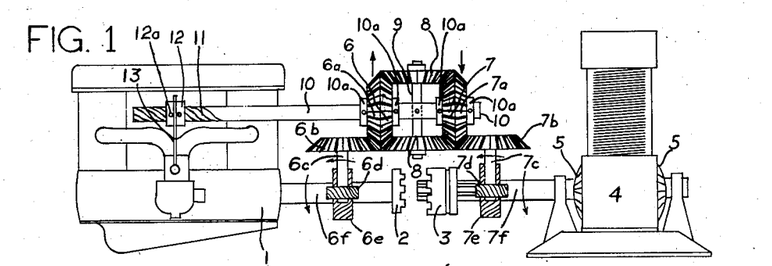
Figure 1 is an elevation showing diagrammatically an electrical power plant with the automatic power-transmission synchronizer connected thereto.

It will be seen that this invention is applicable to synchronize any mechanical power transmission, as hereinbefore defined, but for the present purpose of disclosing its operation in detail I shall illustrate an embodiment of it as applied to an automobile power plant and transmission, as shown in the accompanying drawings. However, to render more simple and intelligible the basic principle of the invention, I am first illustrating its application to a single speed transmission, showing for this purpose an embodiment of the invention as applied to an electrical power plant in Fig. 1, in which—The power element, (the gas engine 1), drives a load element, (the armature 5 of the dynamo 4), through a transmission of which the fixed element 2 is arranged to be engaged by the sliding element 3, it being assumed that the engine is running and that the load element has just been disconnected, as illustrated, and is still running by its own momentum. Means for varying the speed of the power element 1 consist of a throttle lever 13 engaged by fingers 12a mounted on a threaded nut 12, the nut travelling on a worm 11 on the shaft 10, the shaft 10 intersected transversely by and integrated with the shaft 9 of the floating member 8 of the differential gear 6, 7, 8, so that the right hand, or clock-wise motion, of said floating member closes the throttle and the left hand, or counter-clockwise motion of said floating member opens the throttle. The floating member 8 is actuated on the one hand by the differential driving member 6 (as operated by its driving connections, the bevel gear 6a, fixed to the driving member 6, and driven by the bevel gear 6b, which is carried by the shaft 6c, and through it driven by the helical gear 6d, from its companion gear 6e, which is fixed to the shaft 6f, which may be the crankshaft of the engine 1) and is at the same time coactuated by the opposing differential driving gear 7 (as operated by its similar driving connections, 7a, 7b, 7c, 7d, 7e, and the shaft 7f, which may be the drive shaft of the load element 5). The differential driving members 6 and 7, with their homogeneous bevel gears 6a and 7a, are supported by shaft 10 and idle freely thereon, being spaced by collars 10a which are pinned to shaft 10. The action of the differential gear is such that when its opposing driving members 6 and 7 are moving in opposite directions and at equal speeds, its floating member 8 rotates on a fixed axis, said axis being represented, as shown, by shaft 9, and shaft 10 is stationary. When the driving members 6 and 7 are rotating at unequal speeds a precession is produced in shaft 9 in the direction of rotation of the relatively faster driving member. As shaft 9 is fixed integral with shaft 10, such precession rotates shaft 10. Assuming a clockwise rotation of driving member 6 and a counter-clockwise rotation of the opposing driving member 7, it necessarily follows that when driving member 6 (operated by the engine) is the faster, the resultant action of the floating member 8 pulls the throttle lever 13 towards its closed position, slowing down the engine speed, and when driving member 7 (operated by the load element) is the faster, the action of the floating member 8 pushes the throttle lever 13 towards its open position, increasing the engine speed. It will thus be evident that this mechanism embodies my primary object, in that the means for varying the speed of the power element functions automatically to vary the speed of the power element inversely with any difference in speed of the power element relative to the speed of the load element, thus synchronizing the clutch element 2 with the clutch element 3 and enabling a safe and smooth re-engagement of clutch elements 2 and 3 while in motion.

Figures 2, 3, 4, 5:
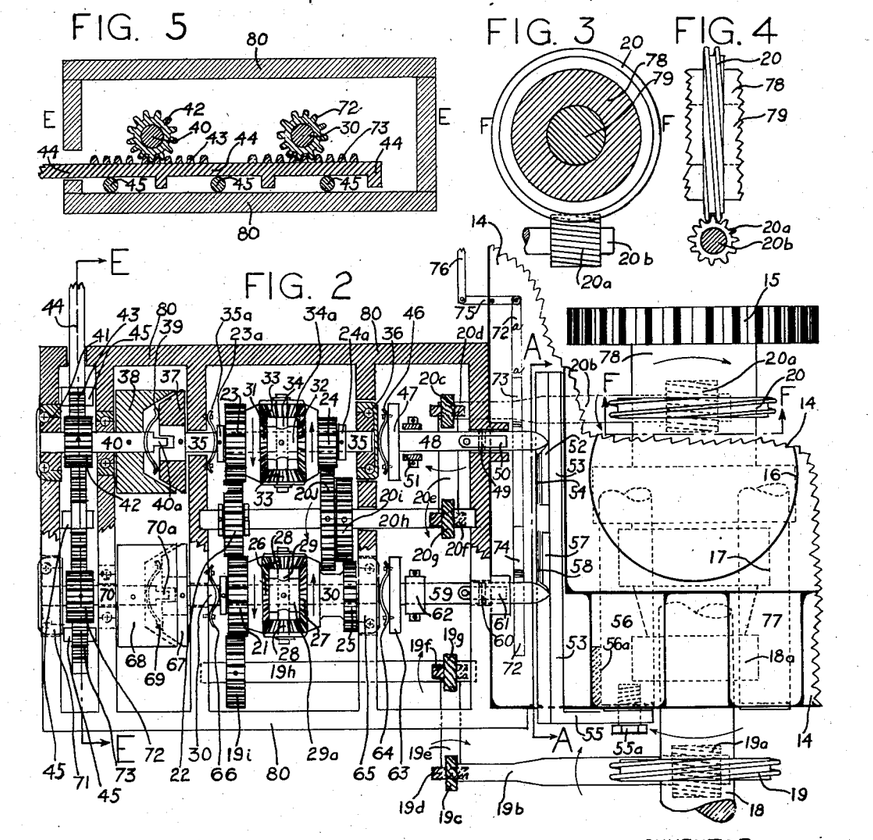
Figure 2 shows an embodiment of the invention in a synchronizer for high and intermediate gear driving ratios of an automobile, with its driving attachments from the transmission of an automobile.
Figure 3 is a view of a driving connection from the cluster-gear of the transmission from the line F, F in Fig. 2, looking in the direction of the arrows.
Fig. 4 is an elevation of the same driving connection illustrated in Fig. 3.
Fig. 5 is a section on the line E, E of Fig. 2, looking in the direction of the arrows.

In Fig. 2 the numeral 14 indicates the top of a transmission case of an automobile, a portion of which has been cut away. I have assumed that anyone familiar with the art will see that the sliding gears, the spline shaft, the shifter forks, the clutch shaft and driving gear have been omitted for the sake of clarity, leaving in view the cluster-gear, of which the large driven gear 15 and the barrel 78 are shown exposed and of which the intermediate 16, low 17 and reverse 18a driving gears are shown in dotted line. The portion of the propeller shaft 18 which is under the transmission case cover 14 and portions of the high and intermediate gear shifter bar 56 and the low and reverse gear shifter bar 77 are also shown in dotted line in neutral setting. As in Fig. 1, I have chosen a numeral combined with letters to indicate the several elements of each geared driving connection to the driving gears of the differentials. A helical gear 19 is mounted on the propeller shaft 18 and drives a pinion 19a with further driving connections comprising the shaft 19b, helical gears 19c and 19d, the shaft 19e, helical gears 19f and 19g, the shaft 19h, and the pinion 19i. A similar helical gear 20 is mounted on the cluster-gear barrel 78 and drives the pinion 20a with the continuing driving connections comprising the shaft 20b, helical gears 20c and 20d, the shaft 20e, helical gears 20f and 20g, the shaft 20h and the two pinions 20i and 20j. The curving arrows indicate the direction of rotation of the several shafts comprised in these driving connections.

Two opposed differential driving gears 26 and 27 are arranged to rotate freely on a shaft 30 and jointly drive a differential floating member composed of gears 28, 28 which rotate freely on shaft 29. Fixed to the driving gear 26 is a pinion 21 which is meshed with pinion 19i, the opposing driving gear 27 being similarly fixed to pinion 25 which is meshed with pinion 20i. Pinions 20i and 19i have been shown to be the termini of geared driving connections respectively from the cluster-gear barrel 78 and the propeller shaft 18. Now, the cluster-gear is driven by a pinion fixed on the clutch shaft which, while the clutch is engaged, is driven by the engine. It must be pointed out that, having chosen in this device to illustrate the geared driving connections from the engine to the differential as commencing from the cluster-gear, it is necessary to assume the clutch constantly engaged. If we assume gear 20 equal to gear 19, pinion 20a equal to pinion 19a; gears 20c and 20d equal to gears 19c and 19d, and gears 20f and 20g equal to gears 19f and 19g, it follows that the speed relation of shaft 20h to shaft 19h is the same as the speed relation between the cluster-gear and the propeller shaft. Suppose intermediate driving gear 16 of the cluster-gear to be made with twenty-five teeth and that its mating sliding gear on the spline shaft is made with twenty-three teeth, and further assuming that pinion 20i is made with twenty-five teeth and that pinion 25 is made with twenty-three teeth, and that pinions 19i and 21 are equal to each other, each thus having twenty-four teeth, it necessarily follows that when the vehicle is running in intermediate gear, the differential driving gears 26 and 27 will be rotating in opposite directions and at equal speeds and that the differential floating member shaft 29 will be stationary. In a transmission designed for a different gear ratio, in which for intermediate gear, for example, a twenty-six toothed gear might drive a twenty-two toothed gear, it would merely be necessary to provide that pinion 20i should be made with twenty-six teeth and pinion 25 with twenty-two teeth to correlate the differential driving gears as described.

Continuing the description of the geared driving connection from the propeller shaft 18, pinion 21 drives pinion 22 which is arranged to idle freely on shaft 20h and to drive pinion 23 which is fixed to a differential driving gear 31. The opposing differential driving gear 32 is fixed to the pinion 24 which is driven by the pinion 20j. The floating member of this differential comprises gears 33, 33 and their connecting shaft 34. If we suppose the driven gear 15 of the cluster gear to be made with thirty-one teeth and to be driven by the clutch-shaft through a pinion made with seventeen teeth, and if pinion 20j has thirty-one teeth and pinion 24 has seventeen teeth, and if pinions 19i, 21, 22 and 23 each have twenty-four teeth, it will be obvious that when the vehicle is running in high gear the opposing differential driving gears 31 and 32 will be travelling in opposite directions and at equal speeds and that the differential floating member shaft 34 will be stationary.

Having now illustrated and described a differential synchronizer 26, 27, 28, 29 with its geared driving connections from the engine, and from a moving part of the vehicle (the propeller shaft 18), geared in ratios appropriate to intermediate gear drive of the vehicle, and a second similar differential synchronizer 31, 32, 33, 34 geared in ratios appropriate to high gear drive, it is only necessary to point out that a third differential synchronizer may be provided for low gear, and so on for any number of ratios as may be required for any variable speed transmission.

For describing the operating means from a differential floating member to the throttle of the propelling engine, I will trace the connection from the high gear differential synchronizer 31, 32, 33, 34. Pinion 23 is fixed to driving gear 31 and both together idle freely on shaft 35. Pinion 24, fixed to driving gear 32, likewise idles freely on shaft 35. Spacing collars, 23a, 24a, 34a, fixed on shaft 35, are provided to preserve the alignment of the pinions and driving gears. The floating member shaft 34 is fixed transversely through shaft 35 and when subject to precession, as induced by any difference in speed between the driving gears 31 and 32, it rotates shaft 35. This shaft 35 is borne at one end by a thrust bearing 36 and is provided at the other end with a male clutch element 37 which is normally held disconnected from the female clutch element 38 by the springs 35a and 39.

The shaft 35, together with all its appurtenances is slidable axially, and by adequate pressure on the thrust bearing 36 can be made to compress the springs 35a and 39 and frictionally engage the clutch elements 37 and 38.

The female clutch element 38 is fixed on the shaft 40 which is borne by the thrust bearing 41 fixed in the wall 80 of the case. This shaft 40 carries a pinion 42 in mesh with a rack 43 fixed on a rod 44 which is connected to the lever of the throttle of the propelling engine. The rod 44 rides on rollers 45, 45, 45 which rest on the floor of the case. When the clutch elements 37 and 38 are frictionally engaged, the clock-wise rotation of the shaft 35 which is produced when gear 32 (driven by the engine) is faster than gear 31 (driven by the vehicle) will pull the throttle lever rod 44, reducing the fuel supply and slowing the engine down until the gears 32 and 31 are travelling at equal speeds. Conversely, when gear 32 is slower than gear 31, the shaft 35 will rotate counter-clockwise, and, when the clutch 37, 38 is engaged, will push the throttle lever rod 44, increasing the fuel supply and speeding the engine up until the gears 32 and 31 are rotating at equal speeds.

As has been shown, when the vehicle is running in high gear the differential synchronizer driving gears 31, 32, are running at equal speeds and the floating member shaft 34 is stationary. Conversely, it is manifest that when the vehicle is coasting in neutral and the differential driving gears 31 and 32 are running equally and the differential floating member shaft 34 is stationary the engine must of necessity be running at high gear ratio in relation to the speed of the vehicle and consequently the separated transmission elements (in this instance, the direct drive from the clutch shaft to the spline shaft) must be travelling at the same linear speed and be therefore susceptible of smooth re-engagement.

The appurtenances to the differential synchronizer 26, 27, 28, 29 are similar throughout to those described as relating to the differential synchronizer 31, 32, 33, 34, consequently an adequate pressure against the thrust bearing 65 will compress the springs 66 and 69 and engage the clutch elements 67 and 68, the thrust against shaft 70 being received against the thrust bearing 71. When the clutch 67, 68 is thus engaged, the differential floating member shaft 29 is in control of the throttle of the propelling engine through the action of the pinion 72 on its meshing rack 73. Owing to the gear ratios of the geared driving connections as previously explained, when the vehicle is coasting in neutral and the differential driving gears 26 and 27 are rotating at equal speeds and the differential floating member shaft 29 consequently is stationary, the engine will be running at intermediate gear ratio in relation to the speed of the vehicle and consequently the separated transmission elements (in this instance, the intermediate driving gear 16 of the cluster-gear and its mating sliding gear on the spline shaft) will be travelling at the same linear speed and thus susceptible of smooth engagement.

In order to provide selective means for supplying the needful pressure against the thrust bearing 36 or the thrust bearing 65, according as it may be desired to synchronize the high gear or the intermediate gear elements of the transmission, respectively, I have fixed a cam carrier 53, having a transverse yoke 55 fastened by the bolt 55a to the high and intermediate gear shifter bar 56. This cam carrier 53 bears operating cams 52 and 57 and disengaging cams 54 and 58. A slot 56a is provided to receive the yoke 55 when the shifter bar 56 is moved towards high gear. When the shifter bar 56 is thus moved towards high gear the cam 52 immediately forces the cam follower 48 to the left through the guide 51, supplying a resilient pressure through the spring 46 mounted on the cross support 47, this pressure driving against the thrust bearing 36 with the effect of synchronizing the high gear elements of the transmission as previously described. The cam follower 48 is broken by a hinge 49 allowing a small upward movement of the right end, but normally held against such upward bending by the downward pressure of the spring 50. As the shifter bar 56 completes its forward movement towards high gear the cam 54 forces the cam follower 48 to bend upwards at the hinge 49 until it is lifted clear of the influence of cam 52 at which point the influence of the springs 35a and 39 return the cam follower to the right and release the clutch elements 37 and 38. On the return of the shifter bar to neutral position (as illustrated in the drawings) the cam follower 48 rides on the upper edge of the cam 52 until the end thereof is reached at which point the spring 50 snaps the cam follower 48 down into its original position as shown in the drawings.

When the shifter bar 56 moves in the reverse direction, from neutral (as illustrated) to engage intermediate gear, the cam 57 operates the cam follower 59 to press through its spring 64 against the thrust bearing 65, engaging the clutch 67, 68 and thereby, as described, synchronizing the intermediate gear elements of the transmission. On the further travel of the shifter bar 56 to complete engagement, the cam 58 bends the cam follower 59 upwards at its hinge 60, releasing it from cam 57 and disconnecting the clutch 67, 68 under the influence of the springs 66 and 69. On the return of the shifter bar 56 to neutral the cam follower 59 rides on the cam 57 and at the end of the movement is restored by the spring 61 to its original position, as illustrated.

A cam carrier 72a is provided, bearing cams 73a and 74 having an upward influence on the hinged portions of the cam followers 48 and 59 sufficient to lift them clear of the operation of both cams 52 and 57. This is operated by a connection from the draw bar 76 to the clutch pedal so that when the clutch is disengaged the entire synchronizing device is inoperative, as, according to the previous explanation, the device requires a driving connection from the engine to coact with the driving connection from the vehicle. Having chosen to illustrate the said driving connection from the engine as utilizing the barrel 78 of the cluster-gear for one of its elements, it is necessary under this condition, for the operation of the differential synchronizer, to leave the clutch engaged, as otherwise there would be a break in the said driving connection from the engine. Further explanation of the action of the disconnecting cams 73a and 74 will be given in due course.

In Fig. 3, the numeral 79 represents the countershaft carrying the cluster-gear, on the barrel 78 of which is mounted the helical gear 20. Further driving connections, the pinion 20a and shaft 20b also appear in these drawings. The same elements appear in Fig. 4 and can be easily identified without further explanation.

The section through the case 80 shown in Fig. 5 is illustrative of the rod 44 which leads to the throttle lever of the propelling engine and which bears sections of rack 43 and 73 through which pinion 42 or pinion 72 can actuate the throttle according as the high gear or intermediate gear differential synchronizer, respectively, may be functioning.

Figure 6:
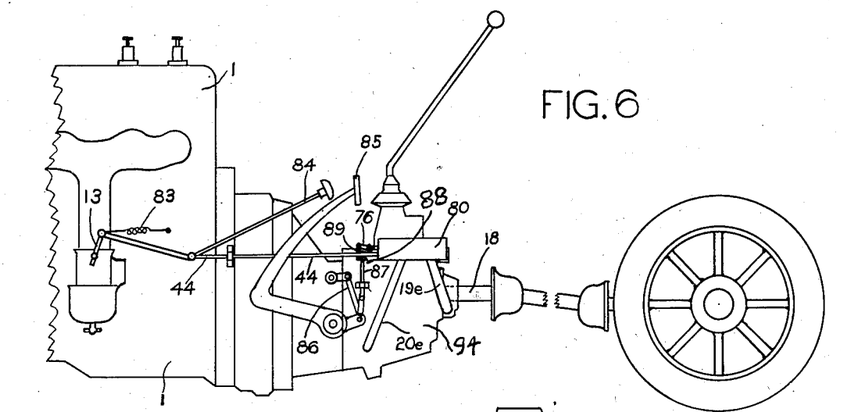
Fig. 6 shows diagrammatically the association of an embodiment of the invention with an automobile, having conventionally illustrated elements of the driving connections of the device.

The diagrammatic representation of an automobile power plant shown in Fig. 6 is provided to illustrate the association of certain elements of a device embodying the invention. The case containing the differential synchronizers is designated by the numeral 80. An advantageous position of driving shafts 20e, leading from the cluster-gear barrel 78, and 19e, leading from the propeller shaft 18, is shown outlined against the transmission case 94. The throttle actuating rod 44, shown in Figs. 2 and 5 with a broken termination, is here shown in its full extension as connected to the throttle lever 13. The foot throttle 84 and the regular throttle-closing spring 83 are also indicated to show graphically the direction of action of the rod 44. A part of the mechanism is shown whereby the action of de-clutching renders the synchronizer inoperative. When the clutch pedal 85 is depressed to raise the clutch lever 86 it also raises a push rod 87 against the horizontal arm 88 of a bell crank throwing the vertical arm 89 thereof forward and thus pulling the draw bar 76 which pushes the disengaging cams 73a and 74 (as already shown in Fig. 2) into operative position.

Figures 7, 8:
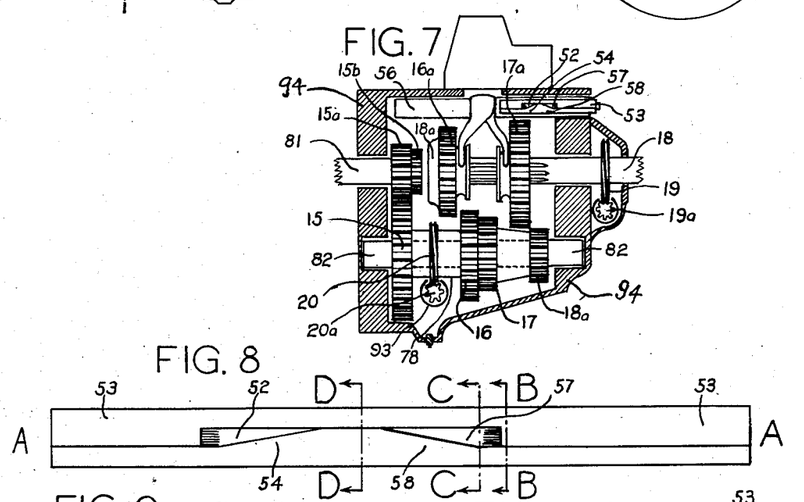
Fig. 7 shows an enlarged medial section of the transmission elements of the automobile illustrated in Fig. 6, with details of the operating connections for the device embodying the invention.
Fig. 8 is an enlarged view of a cam carrier and cams taken from the line A, A in Fig. 2, looking in the direction of the arrows.
Figure 9:
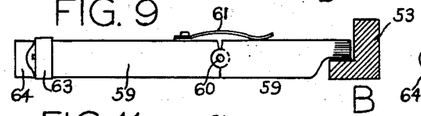
Fig. 9 shows a section on the line B, B in Fig. 8, looking in the direction of the arrows, with a cam follower associated therewith.
Figure 10:
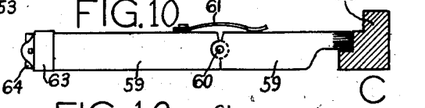
Fig. 10 shows a section on the line C, C in Fig. 8, looking in the direction of the arrows, with a cam follower associated therewith.
Figure 11:
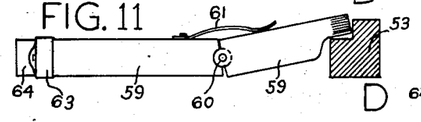
Fig. 11 shows a section on the line D, D in Fig. 8, looking in the direction of the arrows, with a cam follower associated therewith.
Figure 12:
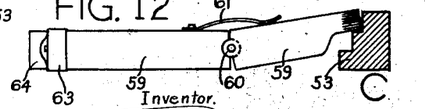
Fig. 12 shows the section on the line C, C in Fig. 8, with the cam follower associated therewith, in a different position from that shown in Fig. 10.

An enlarged medial section of the transmission case 94 is shown in Fig. 7, to make more clear the arrangement of the helical gear 19 on the propeller shaft 18 with the pinion 19a, and the helical driving gear 20 on the cluster-gear barrel 78 with the pinion 20a. The numeral 93 denotes a section of a tubular housing for the pinion 20a, slotted on its upper side to permit the meshing of helical gear 20 with the pinion 20a, said tubular housing 93 being placed transversely across the transmission case 94 and arranged to be secured to and supported by the walls thereof. The cam carrier 53 fixed to the high and intermediate gear shifter bar 56 is also shown in Fig. 7, said cam carrier 53 carrying high gear synchronizer engaging cam 52, high gear synchronizer disengaging cam 54, intermediate gear synchronizer engaging cam 57, and intermediate gear synchronizer disengaging cam 58. The same cam carrier 53 is shown enlarged in Fig. 8, as viewed from the line A, A in Fig. 2, and carrying the above described cams, 52, 54, 57, 58. Fig. 9, shows a section of the cam carrier 53 taken at the line B, B in Fig. 8 and the intermediate gear synchronizer operating cam follower 59 associated therewith in inoperative position. Fig. 10 shows a section of the cam carrier 53 taken at the line C, C in Fig. 8, with the cam follower 59 in its operative position as influenced by cam 57. Fig. 11 shows a section of the cam carrier 53 taken at the line D, D in Fig. 8, with the cam follower 59 returned to its original inoperative position, its hinged portion having been raised by cam 58 beyond the influence of cam 57. Fig. 12 shows a section of the cam carrier taken at the line C, C in Fig. 8, with the cam follower 59 still in inoperative position and riding on top of cam 57 as if the shifter bar 56 were being brought back towards neutral setting after having been backward in intermediate gear position.

Figure 13:
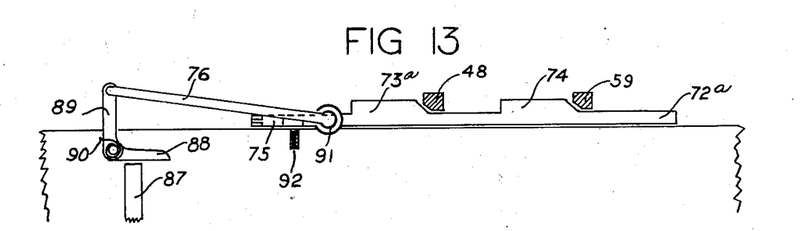
Fig. 13 is an elevation of the disengaging cam carrier designated by the numeral 72 in Fig. 2, showing it in inoperative position.
Figure 14:
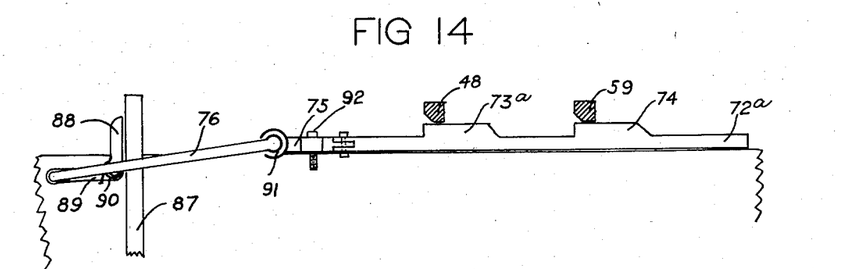
Fig. 14 shows the operative position of the mechanism illustrated in Fig. 13.

Fig. 13 shows an elevation of the clutch pedal operated disengaging cam carrier 72a with its disengaging cams 73a and 74 in inoperative position with respect to cam followers 48 and 59 which are shown in shaded cross section in these drawings. The same mechanism is shown in Fig. 14 as in operative position, the push rod 87 operated by the clutch having risen and thrown over the bell crank, 88, 89 against its spring resistance 90, the drawbar 76 attached to the bell crank arm 89 having operated through the ball joint 91 to pull the cross-arm lever 75, which is fulcrumed at the pivot 92, and thus to push the cam carrier 72a with its cams 73a and 74 under the hinged portions of the cam followers 48 and 59, lifting the said cam followers 48 and 59 above the influence of the operating cams 52 and 57 and so disconnecting and rendering the synchronizers inoperative when the clutch pedal 85 is depressed.

Figure 15:
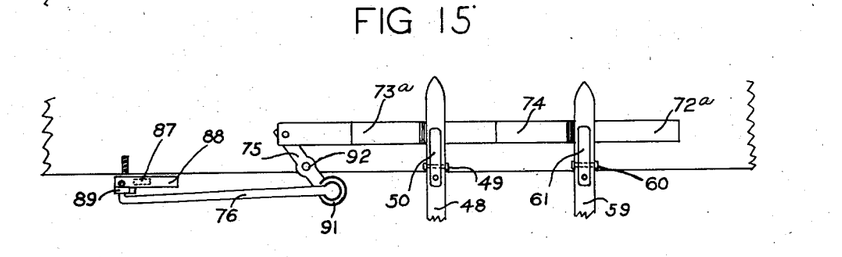
Fig. 15 is a plan view of the mechanism illustrated in elevation in Fig. 13, in inoperative position.

Fig. 15 is a plan view of the same mechanism in the same situation as shown in elevation in Fig. 13.

Figure 16:
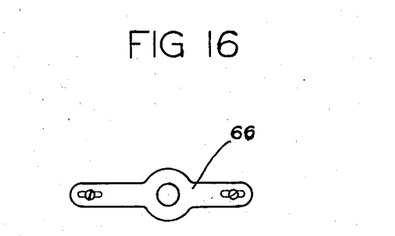
Fig. 16 is an enlarged illustration of the spring designated by the numeral 66 in Fig. 2.

Fig. 16 shows a face view of the spring 66 which was shown as a side view in Fig. 2.

The advantages of this invention as embodied in a synchronizer for an automobile transmission are several. Among them, in addition to the advantage already named, of ensuring safe and smooth gear shifting and thus saving wear on the transmission gears, are the saving of wear on clutch linings because of the non-use of the clutch for shifting, the saving of wear on universal joints and rear-end assemblies because of the freedom from shocks common in unskillful shifting, and the saving on brake linings due to the fact that facility in shifting to lower gear ratios when going down grades offers encouragement to a driver to use such lower gears freely. The difficulty of shifting to lower gear when going down grade, due to the fact that the transmission elements must be accelerated relative to the vehicle speed, is so great that comparatively few drivers ever acquire the necessary skill to manage it safely. In this connection the advantage of the differential synchronizer is self-evident, inasmuch as by it the engine speed is automatically regulated to conform exactly to the speed of the vehicle and thus the descending shift presents no more difficulty than the ascending shift.

I claim:

1. In combination, a gas engine, a variable speed transmission, a vehicle propelled by said engine through said transmission, a plurality of differential gears, a plurality of geared driving connections from said engine to driving members of said differential gears, a plurality of geared driving connections from a moving part of said vehicle to the opposing driving members of said differential gears, said pluralities of geared driving connections conforming in their gear ratios to the speed ratios of the said variable speed transmission, a plurality of driving connections from the floating members of said differential gears to the throttle of said engine, and selective means for controlling said throttle by the driving connection from one of said differential floating members.

2. The combination, in an automatic transmission synchronizer for a gas engine propelled vehicle, substantially as described, with a variable speed transmission, of a plurality of differential synchronizers having geared driving connections from the engine and from the vehicle geared in ratios severally appropriate to the ratios in said variable speed transmission, a plurality of normally disconnected operating connections between said differential synchronizers and the throttle of the propelling engine, a plurality of means for connecting said normally disconnected operating connections, and selective means for operating one means for connecting one normally disconnected operating connection between such one of said differential synchronizers and the throttle of the propelling engine as may be required.

3. The combination, in an automatic transmission synchronizer for a gas engine propelled vehicle, substantially as described, with a variable speed transmission, of a plurality of differential synchronizers, having geared driving connections from the engine and from the vehicle geared in ratios severally appropriate to the ratios in said variable speed transmission, a plurality of normally disconnected operating connections between said differential synchronizers and the throttle of the propelling engine, a plurality of means for connecting said normally disconnected operating connections and themselves actuated by the movement of a part of the said variable speed transmission, and selective means for operating singly one such means for connecting one such normally disconnected operating connection between one such said differential synchronizer and the throttle of the propelling engine, such differential synchronizer to be selected as shall be appropriate in the gear ratios of its geared driving connections from the engine and from the vehicle to conform with the gear ratio of the mating gears in the said variable speed transmission which are about to be engaged, such selective means to be actuated by a part of the selective mechanism of the said variable speed transmission and so positioned and timed as to complete its function of connecting the designated normally disconnected operating connection between the designated differential synchronizer and the throttle of the propelling engine before the contact of the mating gears in the said variable speed transmission which are about to be engaged in intermeshing relation.

4. The combination, in an automatic transmission synchronizer for a gas engine propelled vehicle, substantially as described, with a variable speed transmission, of a plurality of differential synchronizers (each differential synchronizer comprising a driving differential gear together with geared driving connections thereto from the engine, and an oppositely rotating driving differential gear together with geared driving connections thereto from the propeller shaft of the vehicle, such geared driving connections being in such ratios with each other as to drive the said driving differential gears at equal speeds when the engine is running at a predetermined ratio to the speed of the vehicle, and a floating differential gear situated between and coactuated by said driving differential gears, and a shaft answerable to the precession of said floating differential gear, said shaft borne by a thrust bearing at one end and bearing a frictional clutch element at its other end and slidable axially, and a companion clutch element, said clutch elements being normally disconnected from each other and maintained disconnected by spring means, the second named clutch element borne on one end of a second shaft coaxial with the first named shaft and at its farther end borne by a second thrust bearing and immobile axially, and on the second named shaft a pinion meshing with a rack borne by a rod leading to the throttle of the engine), a plurality of means for temporarily connecting the normally disconnected clutch elements between the shafts actuated by the floating differential gears and the shafts geared to actuate the throttle of the engine (each of said temporarily connecting means comprising a cam movable and returnable transversely with respect to the axes of the said normally disconnected clutch elements and formed to rise toward said clutch elements while so moving transversely thereto, and a second cam situated between said first named cam and said clutch elements and movable parallel with the first named cam and formed to rise transversely with respect to its own movement and at the same time transversely with respect to the rise of the first named cam, and so dimensioned as to rise past and eclipse the influence of said first named cam, and a hinged cam follower operated by both cams and mounted substantially coaxial with the said normally disconnected clutch elements and slidable therea towards when influenced by the rise of the first named cam, the hinged portion of said cam follower being answerable to the influence of the second named cam and bearing spring means so disposed as to resist such influence and to restore said hinged portion to its original position coaxial with said clutch elements when said hinged portion of the cam follower is uninfluenced by said second named cam, the influence of the second named cam being to disengaged the cam follower from the influence of the first named cam after having been temporarily subject thereto, and a resilient member interposed between the said cam follower and the thrust bearing of the slidable shaft of one of said normally disconnected clutch elements to resiliently transmit the axial movement of the cam follower through said shaft to said clutch element and thereby to connect said normally disconnected clutch elements when the first named cam commences its described transverse movement, said resilient member, aided by the described disconnecting spring means within said clutch, so reacting towards the cam follower as to return said cam follower into inoperative position when said cam follower is freed from the influence of the first named cam by the transverse influence of the second named cam, said cam follower being arranged to ride inoperative upon a neutral face of said first named cam during the returning movement of said cams and by its described spring means acting upon its hinged portion to be restored to potentially operative position when said returning movement has brought said first named cam to its initial position), and selective means for operating one such described means for temporarily connecting one such described normally disconnected operating connection between one such described differential synchronizer and the throttle of the said propelling engine as may be required to cause said engine to move in a predetermined speed relative to the speed of the vehicle, such predetermination being that of the gear ratio of the variable speed transmission elements which may be about to be engaged, (said selective means comprising a cam carrier fixed to a shifter bar of said variable speed transmission and bearing cams as herein described, said cams being so positioned and dimensioned that when such said shifter bar is moved to carry a given transmission gear towards interlocking relation with its mating gear, the said cams shall first co-operate to connect the particular differential synchronizer appropriate to said given transmission gear ratio unto said throttle of the propelling engine, substantially as described).

5. The combination, with an automatic transmission synchronizer for a gas engine propelled vehicle, substantially as described, having a plurality of differential synchronizers with normally disconnected operating connections to the throttle of the propelling engine and means for temporarily connecting said normally disconnected operating connections, of operative connecting means from the clutch of the vehicle to the means for temporarily connecting the normally disconnected operating connections between the differential synchronizers and the throttle of the propelling engine arranged to engage and hold inoperative the said means for temporarily connecting the normally disconnected operating connections between the differential synchronizers and the throttle of the propelling engine whenever the engine is declutched from the vehicle.

6. The combination, with an automatic transmission synchronizer for a gas engine propelled vehicle, substantially as described, having a plurality of differential synchronizers normally disconnected and temporarily connectible with the throttle of the propelling engine, of disengaging means actuated by the clutch pedal of the vehicle for rendering the synchronizers inoperable on the throttle of the propelling engine whenever the clutch pedal is depressed.

7. A co-ordinating and controlling differential mechanism for a variable speed transmission in a gas engine propelled vehicle arranged to vary the speed of the engine to conform in a plurality of predetermined ratios with the speed of the vehicle when said variable speed transmission is disengaged, comprising a plurality of reciprocally movable members each having a normally disconnected connectible operative connection to the throttle of said engine and each influenced by oppositely influencing speed conveying means from the said engine and the said vehicle in a speed ratio conforming with one of said plurality of predetermined ratios between the engine speed and the vehicle speed, and selective means for connecting one or the other of said reciprocally movable members with the throttle of the engine.

8. In combination, a motor, transmission elements, a load element arranged to be driven by said motor through said transmission elements, a reciprocally moving differential floating member operatively connected to vary the speed of the motor, and oppositely moving co-acting driving connections from said motor to said differential floating member and from said load element to said differential floating member.

9. In combination, a gas engine, a disconnectible rotary load element driven by said gas engine, differential gearing comprising two oppositely rotating driving gears actuating a reciprocally moving floating member, means operated by said floating member for varying the fuel supply to said gas engine, and co-acting driving connections between said gas engine and one rotating driving gear and between said rotary load element and the other oppositely rotating driving gear of said differential gearing.

10. In combination, a gas engine, a vehicle propelled by said engine through disconnectible transmission elements, differential gearing comprising two oppositely rotating driving gears driving a reciprocally movable floating member, and co-acting driving connections between said engine and one rotating driving gear of said differential gearing and between a moving part of said vehicle and the other oppositely rotating driving member of said differential gearing and between the reciprocally movable floating member of said differential gearing and the throttle of said engine, said co-acting driving connections being so disposed in relation to each other and to the said engine and to the said vehicle and to the said differential gearing and to the throttle of the said engine as to automatically regulate the speed of the said engine to conform to the speed of the said vehicle when the said transmission elements are disconnected.

11. In combination, a gas engine, a vehicle propelled by said engine through transmission gears movable into and out of intermeshing relation, differential gearing comprising two oppositely rotating driving gears driving a reciprocally movable floating member, and co-acting geared driving connections between said engine and one rotating driving gear of said differential gearing and between a moving part of said vehicle and the other oppositely rotating driving member of said differential gearing and between the reciprocally movable floating member of said differential gearing and the throttle of said engine, said co-acting geared driving connections being so disposed in relation to each other and to said engine and to said vehicle and to the throttle of said engine and geared in such ratio as to automatically regulate the speed of the engine to conform to the speed of the vehicle in such ratio that the said transmission gears shall move at equal linear speeds when out of intermeshing relation.

12. In combination, a gas engine, a change-speed transmission, a vehicle propelled by said engine through said transmission, differential gearing comprising two oppositely rotating driving gears jointly controlling a reciprocally movable floating member, geared operating connections from the engine to one rotating driving gear of said differential gearing and from a moving part of the vehicle to the oppositely rotating driving gear of said differential gearing, said geared operating connections conforming in their gear ratios to one of the speed ratios of the said change-speed transmission, and an operating connection from the floating member of the said differential gearing to the throttle of the said engine.

13. In combination, a gas engine, a change-speed transmission, a vehicle propelled by said engine through said transmission, differential gearing comprising two oppositely rotating driving gears jointly controlling a reciprocally movable floating member, geared operating connections from the engine to one rotating driving gear of said differential gearing and from a moving part of the vehicle to the other oppositely rotating driving gear of said differential gearing, said geared operating connections conforming in their gear ratios to one of the speed ratios of the said change-speed transmission, an operating connection from the floating member of said differential gearing to the throttle of said engine, and interposed means so disposed in connection with the said transmission that whenever the disengaged elements of said transmission to which the gear ratios of the said geared operating connections conform are moved towards engagement the said transmission elements shall first operate through said interposed means to influence the said operating connection from the floating member of said differential gearing to regulate the speed of said engine in response to the differential action of said differential gearing so as to automatically synchronize the said disengaged transmission elements before they are engaged.

14. In combination, a gas engine, a change-speed transmission, a vehicle propelled by said engine through said transmission, differential gearing comprising two oppositely rotating driving gears jointly controlling a reciprocally movable floating member, geared operating connections from said engine to one rotating driving gear of said differential gearing and from a moving part of the vehicle to the other oppositely rotating driving gear of said differential gearing, said geared operating connections conforming in their gear ratios to one of the speed ratios of the said change-speed transmission, a normally disconnected operating connection from the floating member of said differential gearing to the throttle of said engine, and means for temporarily connecting the said normally disconnected operating connection from the floating member of said differential gearing to the throttle of said engine.

15. In combination, a gas engine, a change-speed transmission, a vehicle propelled by said engine through said transmission, differential gearing comprising two oppositely rotating driving gears jointly driving a reciprocally movable floating member, geared operating connections from said engine to one rotating driving gear of said differential gearing and from a moving part of said vehicle to the other oppositely rotating driving gear of said differential gearing, said geared operating connections conforming in their gear ratios to one of the speed ratios of the said change-speed transmission, a normally disconnected operating connection from the reciprocally movable floating member of said differential gearing to the throttle of said engine, and interposed means intercepting the speed changing movement of said change-speed transmission and operatively connected to automatically connect the said normally disconnected operating connection from said floating member of said differential gearing to the throttle of said engine when said change speed transmission is moved towards engagement in the transmission gear to whose ratio the gear ratio of the said geared operating connections of the differential gearing conforms.

16. In combination, a power element having a speed-varying member, a transmission, a load element arranged to be connectible with said power element through said transmission, and a differential synchronizer comprising a shaft, two oppositely rotating bevel gears thereon, geared driving connections to said oppositely rotating bevel gears from said power element and said load element respectively, said geared driving connections geared in such ratio one to the other as to conform to the speed ratio between the said power element and the said load element, a reciprocally movable floating member comprising a bevel gear meshed with the said two oppositely rotating bevel gears and mounted on an axis transverse to the said shaft, and an operating connection between said reciprocally movable floating member and the speed-varying member of said power element.

17. In combination, a motor, transmission elements, a load element arranged to be driven by said motor through said transmission elements, and a differential synchronizer comprising two oppositely rotating gears, geared operating connections to said two oppositely rotating gears from said motor and said load element respectively, said geared operating connections geared in such ratio one to the other as to conform to the ratio of said transmission elements to each other, a reciprocally movable gear meshed with the said two oppositely rotating gears and axially transverse to the said two oppositely rotating gears, and an operating connection from said reciprocally movable gear to vary the speed of said motor.

18. In combination, a gas engine, a disconnectible rotary load element driven by said gas engine, and a differential synchronizer comprising two oppositely rotating gears, geared operating connections from said gas engine to one of said two oppositely rotating gears and from said rotary load element to the other of said two oppositely rotating gears, said geared operating connections geared in the same ratio one with the other as the speed ratio between said engine and said load element when said load element is driven by said engine, a reciprocally movable gear meshed with said two oppositely rotating gears and mounted on an axis transverse to the axis of the said two oppositely rotating gears, and operative means operated by said reciprocally movable gear to vary the supply of fuel to said gas engine.

19. In combination, a gas engine, a vehicle propelled by said engine through disconnectible transmission elements, and a differential synchronizer comprising two oppositely rotating gears jointly driving a reciprocally movable gear mounted on an axis transverse to that of the said two oppositely rotating gears, and co-acting driving connections between said engine and one of said two oppositely rotating gears and between a moving part of said vehicle and the other of said two oppositely rotating gears and between said reciprocally movable gear and the throttle of said engine, said co-acting driving connections being so disposed in relation to each other and to the said engine and to said vehicle and to said oppositely rotating gears and to said reciprocally movable gear and to the throttle of said engine as to automatically regulate the speed of said engine conformably to the speed of said vehicle when the said disconnectible transmission elements are disconnected.

20. In combination, a gas engine, a change-speed transmission, a vehicle propelled by said engine through said transmission, and a differential synchronizer comprising two oppositely rotating gears meshed with and jointly driving an axially transverse and reciprocally movable gear, said two oppositely rotating gears operatively connected the one with said engine and the other with a moving part of said vehicle by geared operating connections conforming in their gear ratios to one of the speed ratios of said change-speed transmission, and an operating connection from said reciprocally movable gear to the throttle of said engine.

21. In combination, a gas engine, a vehicle propelled by said engine through transmission gears movable into and out of intermeshing relation, and a differential synchronizer comprising two oppositely rotating gears meshed with and jointly driving a reciprocally movable gear mounted axially transverse thereto, and geared driving connections between said engine and one of said two oppositely rotating gears and between a moving part of said vehicle and the other of said two oppositely rotating gears and between the said reciprocally movable gear and the throttle of said engine, said geared driving connections being so disposed to co-act in relation to each other and to said engine and to said vehicle and to said two oppositely rotating gears and to said reciprocally movable gear and to the throttle of said engine and geared in such ratio as to automatically regulate the speed of the engine to conform to the speed of the vehicle in such ratio that the said transmission gears shall move at equal linear speeds when out of intermeshing relation.

22. In combination, a gas engine, a change-speed transmission, a vehicle propelled by said engine through said transmission, a differential synchronizer comprising a shaft, two oppositely rotating bevel gears thereon, geared operating connections from said engine and from a moving part of said vehicle respectively to said two oppositely rotating bevel gears, said geared operating connections geared relatively to one another in ratios conforming to one of the speed ratios of said change-speed transmission, a reciprocally movable floating member comprising a bevel gear meshed with and jointly operated by said two oppositely rotating bevel gears and axially transverse to said shaft and axially operatively connected to move said shaft answerably to the reciprocal axial precession of said reciprocally movable floating member, an operating connection from said shaft to the throttle of said engine, and interposed means so disposed in connection with said operating connection from said shaft of said differential synchronizer to the throttle of said engine and with said change-speed transmission that when said change-speed transmission is moved towards engagement in the speed ratio to which in their relative gear ratios the said geared operating connections to the said two oppositely rotating bevel gears of the differential synchronizer conform the said change-speed transmission shall first operate said interposed means to influence the said operating connection from said shaft of said differential synchronizer to the throttle of said engine to regulate automatically the speed of said engine in response to the differential action of said reciprocally movable floating member of said differential synchronizer to automatically synchronize the disengaged elements of the said designated speed ratio of the said change-speed transmission before they are engaged.

23. In combination, a gas engine, a change-speed transmission, a vehicle propelled by said engine through said transmission, a differential synchronizer comprising a shaft, two oppositely rotating bevel gears thereon jointly controlling a reciprocally movable bevel gear transverse axially thereto and operatively connected to reciprocally move said shaft answerably to the reciprocal axial precession of said reciprocally movable bevel gear, geared operating connections from said engine to one of said two oppositely rotating gears and from a moving part of said vehicle to the other of said two oppositely rotating bevel gears, said geared operating connections conforming in their gear ratios to one of the speed ratios of the change-speed transmission, and a normally disconnected connectible operating connection from said shaft of said differential synchronizer to the throttle of said engine arranged so that when it is connected it reciprocally operates said throttle responsive to the reciprocal movement of said shaft, and means for temporarily connecting said normally disconnected operating connection from said shaft of said differential synchronizer to the throttle of said engine.

24. In combination, a gas engine, a change-speed transmission, a vehicle propelled by said engine through said transmission, a differential synchronizer comprising a shaft, two oppositely rotating bevel gears thereon jointly controlling a reciprocally movable bevel gear transverse axially thereto and operatively connected to reciprocally move said shaft answerably to the reciprocal axial precession of said reciprocally movable bevel gear, geared operating connections from said engine to one of said two oppositely rotating gears and from a moving part of said vehicle to the other of said two oppositely rotating bevel gears, said geared operating connections conforming in their gear ratios to one of the speed ratios of the said change-speed transmission, a normally disconnected connectible operating connection from said shaft of said differential synchronizer to the throttle of said engine arranged to reciprocally operate said throttle responsive to the reciprocal movement of said shaft whenever connected, and interposed means intercepting the speed changing movement of said change-speed transmission and operatively arranged to connect the said normally disconnected operating connection from said shaft of said differential synchronizer to the throttle of said engine when said change-speed transmission is moved towards engagement in that transmission gear to whose speed ratio the gear ratios of the said geared operating connections of the differential synchronizer conform.

25. The combination, with an automatic transmission synchronizer for a gas engine propelled vehicle, comprising a reciprocally moving differential floating member and oppositely moving co-acting driving connections thereto from the engine and the vehicle, and having normally disconnected operating connections from said reciprocally moving differential floating member to the throttle of said engine temporarily connectible by interposed means intercepting and operated by the speed changing movement of the transmission of said vehicle, of operative connecting means from the clutch of said vehicle to the said interposed means arranged to engage and move out of intercepting position and hold inoperative the said interposed means whenever the said engine is de-clutched from the said vehicle.

26. The combination, with an automatic transmission synchronizer, comprising a gas engine, a change-speed transmission, a vehicle propelled by said engine through said transmission, a differential gearing co-actuated jointly by said engine and said vehicle and having a reciprocally movable floating member, and having a normally disconnected operating connection from said floating member of said differential gearing to the throttle of said engine temporarily connectible by interposed means intercepting and operated by the speed changing movement of said change-speed transmission, of disengaging means actuated by the clutch pedal of said vehicle to move the said interposed means out of its intercepting position and hold inoperative the said interposed means and thus to render the reciprocal movement of said reciprocally movable floating member of said differential gearing inoperative on the throttle of said engine whenever the clutch pedal is depressed.

27. In combination, a power element having a speed-varying member, a disconnectible load element driven thereby, a reciprocally rotating member operatively connected with said speed-varying member, and oppositely moving driving connections from both the power element and the load element to the said reciprocally rotating member.

28. In combination, a power element having a speed-varying member, transmission elements, a load element arranged to be driven by said power element through said transmission elements, a reciprocally rotating member, oppositely moving driving connections from both the power element and the load element to the said reciprocally rotating member, a normally disconnected operating connection from said reciprocally rotating member to the said speed-varying member, and means for connecting said normally disconnected operating connection.

29. A power transmission synchronizing mechanism comprising, in combination, a power element having a speed varying member, transmission elements, a load element arranged to be driven by said power element through said transmission elements, a reciprocally rotatable differential element, driving connections from both the said power element and the said load element to the said reciprocally rotatable differential element, a normally disconnected operating connection from the said reciprocally rotatable differential element to the speed varying member of the said power element, and means for temporarily connecting the said normally disconnected operating connection.

30. The combination of a power element having a speed-varying member, a disconnectible load element driven by said power element, an epicyclic gear train embodying three interconnected elements, a driving connection from said power element to one of said epicyclic elements, a driving connection from said disconnectible load element to another of said epicyclic elements, and an operative connection from the third of said epicyclic elements to the speed-varying member of the said power element.

REGINALD BLAND.